Oct. 28, 1958      A. D. CROMER      2,857,864

PLANT FOOD AND FERTILIZER APPLICATOR

Filed Feb. 2, 1955

INVENTOR

ALBERT D. CROMER

United States Patent Office 2,857,864
Patented Oct. 28, 1958

2,857,864

PLANT FOOD AND FERTILIZER APPLICATOR

Albert D. Cromer, Augusta, Ga.

Application February 2, 1955, Serial No. 485,653

1 Claim. (Cl. 111—95)

This invention relates to fertilizer applicators.

It is an object of the present invention to provide a fertilizer applicator adapted to be used in flower gardens, small vegetable gardens, on fruit and flower trees, or the like.

It is another object of the present invention to provide a fertilizer applicator which may be embedded in the ground and where upon the movement of a plunger mechanism, the fertilizer will be removed from a hopper forming a part of the invention and driven into the ground, in a novel manner.

Other objects of the present invention are to provide a fertilizer applicator of the above type which is operable by a handle operated gear arrangement and wherein the fertilizer is fed from the hopper by means of a worm and deposited into the ground.

Other objects of the present invention are to provide a fertilizer applicator of the above type having the above objects in mind which is of simple construction, has a minimum number of parts, is easy to use and efficient in operation.

For other objects and a better understanding of the invention, reference may be had to the following detailed description taken in connection with the accompanying drawing, in which.

Figure 1:
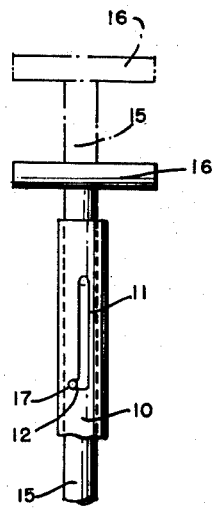
Fig. 1 is a front elevational view shown partly broken away of a preferred embodiment of the present invention shown in operative use with the plunger in the lowered position after the application of the fertilizer to the soil and just before removal of the device from the ground.

Referring now more in detail to the drawing and more particularly to Figs. 1 through 3, 10 indicates an elongated tubular member open at both ends having an elongated slot 11 at its upper end which terminates at its lower end in a lateral enlargement 12.

An L-shaped foot 13 is suitably secured to the lower end of the tubular member 10 and is adapted to abut the soil 14 whereby to limit the penetration of the lower end of the tubular member, as shown in Fig. 1.

A plunger rod 15 of slightly greater length than the tubular member 10 is adapted to be slidably received therewithin and is provided at its upper end with a lateral handle 16. A pin 17 is fixedly carried by the plunger rod 15 and is adapted to ride within the slot 11 and lateral enlargement 12, whereby to limit the movement of the plunger rod and also to lock the same in the depressed position of Fig. 1 by rotation of the rod and movement of the pin into the enlargement 12.

The tubular member 10 near its lower end is provided with three radially spaced elongated slots 18 for a purpose which will hereinafter become clear.

A hopper comprising a hollow cylindrical portion 19 and a frusto-conical portion 20 is secured to the lower end of the tubular member 10 with the frusto-conical portion 20 surrounding the slot 18, the cylindrical portion 19 being secured to the tubular member by means of the ribs 21.

In operation, the hopper 19, 20 is filled with fertilizer whereupon the tubular member 10 is embedded in the ground as shown in Fig. 1 with the limited displacement afforded by the foot 13. As the plunger rod 15 is moved to the uppermost position, limited by the abutment of the pin 17, with the upper end of the slot 11, the fertilizer passes inwardly through the slots 18 and upon the lowering of the plunger rod 15 is forced downwardly into the soil 14, the downward movement being effected by handle 16 and limited by the lower end of the slot 11. The plunger rod is then rotated angularly to bring the pin 17 into the lateral enlargement 12 whereby to lock the plunger rod in the lower position. The lowered device is then removed from the ground, and the operation repeated.

Figure 4:
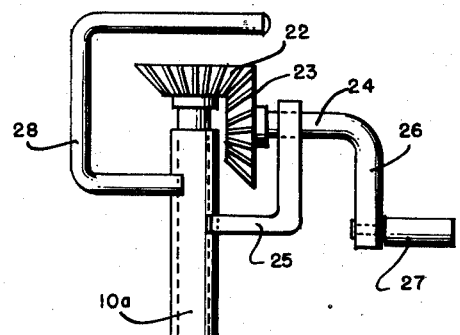
Fig. 4 is a view similar to Fig. 1, but showing a modified form of the present invention.

Referring now particularly to Fig. 4, there is shown a modified form of the present invention wherein the tubular member 10a is provided with the elongated slots 18a and mounts the hopper 19, 20 by means of the ribs 21. However, in this form the upper end of the plunger 15 is devoid of the handle 16 and is instead provided with a bevel gear 22 in mesh with a bevel gear 23 mounted on the shaft 24 journalled in the L-shaped bracket 25 suitably secured to the upper end of the tubular member 10a. The shaft 24 is rotated by means of a laterally bent portion 26 and a rotatably mounted handle 27 forming therewith a crank arm for the bevel gear 23. A handle member 28 is secured to the upper end of the tubular member 10a and is held in one hand while the other hand is employed for rotating the crank arm 26, 27. The lower end of the plunger rod 15 is provided with a worm construction 29 which is adapted to draw the fertilizer inwardly through the slots 18a and to deliver it downwardly into the soil, the lower end of the plunger rod 15 being pointed, as at 30.

Figure 2:
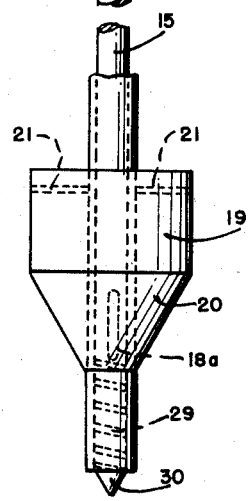
Fig. 2 is a transverse sectional view thereof taken along the line 2—2 of Fig. 1.
Figure 2:
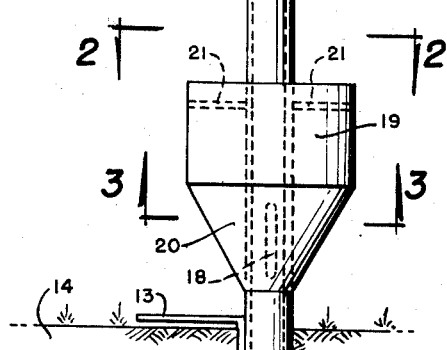
Figure 3:
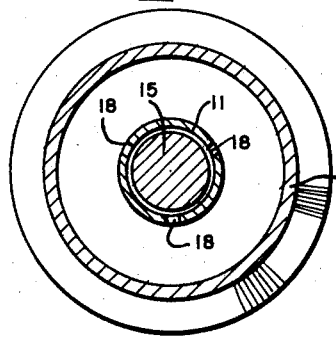
Fig. 3 is a transverse sectional view thereof taken along the line 3—3 of Fig. 1.

In other respects the form of the invention shown in Fig. 4 is the same as that shown in Figs. 1 through 3, and like reference numerals identify like parts throughout the several views.

While various changes may be made in the detail construction, it shall be understood that such changes shall be within the spirit and scope of the present invention as defined by the appended claim.

What I claim as new and desire to protect by Letters Patent of the United States is:

A fertilizer applicator comprising an elongated tubular member open at both ends, hopper means to contain a supply of fertilizer surrounding the tubular member with the lower end of said tubular member extending below said hopper means, means for drawing the fertilizer inwardly through said tubular member from said hopper means and depositing the same within the soil upon the embedding therein of the lower end of said tubular member, said means for drawing the fertilizer inwardly through said tubular member comprising said tubular member within said hopper means having elongated, radially spaced slots connecting the interior of said hopper means with the interior of said tubular member and manually operable means actuable within said tubular member on the upper end thereof for drawing the fertilizer inwardly through said slots and forcing it downwardly into the soil, said manually operable means comprising a shaft rotatable within said tubular member and extending upwardly and downwardly therebeyond, handle means at the upper end of said tubular member for holding the same, a first bevel gear at the upper end of said shaft, a second bevel gear in mesh with said first bevel gear mounted upon a shaft, a bracket mounted in the upper end of said tubular member, said second shaft being journalled in said bracket, crank arm means on the outer end of said second shaft for rotating the same with one hand while said handle means is held in the other hand, and a worm with a pointed end formed on the lower end of said first shaft located within the lower projecting end of said tubular member with its pointed end projecting outwardly of said tubular member adapted to draw the fertilizer from the hopper means inwardly through said slots and drive it downwardly into the soil adjacent the pointed end.

References Cited in the file of this patent

UNITED STATES PATENTS

| | | |
|---|---|---|
| 437,563 | Burchfield | Sept. 30, 1890 |
| 814,809 | Shelly | Mar. 13, 1906 |
| 2,504,786 | Bailey | Apr. 18, 1950 |

FOREIGN PATENTS

| | | |
|---|---|---|
| 7,463 | Austria | May 10, 1902 |
| 108,629 | Germany | Feb. 20, 1900 |
| 117,433 | Germany | Feb. 5, 1901 |
| 329,554 | Germany | Nov. 29, 1920 |